(12) United States Patent
Furuta et al.

(10) Patent No.: US 8,925,147 B2
(45) Date of Patent: Jan. 6, 2015

(54) GROMMET AND WATER STOP STRUCTURE FOR VEHICLE DOOR

(71) Applicant: Yazaki Corporation, Minato-ku, Tokyo (JP)

(72) Inventors: Taku Furuta, Toyota (JP); Katsuya Yoshimura, Kosai (JP); Mitsunori Tsunoda, Toyota (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/305,603

(22) Filed: Jun. 16, 2014

(65) Prior Publication Data

US 2014/0291939 A1 Oct. 2, 2014

Related U.S. Application Data

(63) Continuation of application No. PCT/JP2012/082965, filed on Dec. 19, 2012.

(30) Foreign Application Priority Data

Dec. 22, 2011 (JP) ................................. 2011-281175

(51) Int. Cl.
- *H02G 3/22* (2006.01)
- *F16L 5/00* (2006.01)
- *B60R 16/02* (2006.01)

(52) U.S. Cl.
CPC .................................. *B60R 16/0222* (2013.01)
USPC .......... 16/2.1; 16/2.2; 174/152 G; 174/153 G; 174/650; 296/208

(58) Field of Classification Search
USPC ............... 16/2.1, 2.2, 2.5; 174/152 R, 152 G, 174/153 G, 154, 167, 650, 659, 660, 668; 277/602, 606, 608, 607; 248/56, 68.1, 248/74.1, 74.2, 74.3, 231.9; 296/146.5, 296/146.7, 146.8, 146.9, 208

See application file for complete search history.

(56) References Cited

U.S. PATENT DOCUMENTS 4,000,829 A * 1/1977 Johnson et al. ............... 220/265
6,051,790 A * 4/2000 Takeuchi et al. ............ 174/72 A (Continued)

FOREIGN PATENT DOCUMENTS

JP 2002-027640 A 1/2002
JP 2002-211334 A 7/2002

(Continued)

OTHER PUBLICATIONS

International Search Report issued in corresponding International Application No. PCT/JP2012/082965 mailed Feb. 5, 2013.

(Continued)

*Primary Examiner* — Chuck Mah
(74) *Attorney, Agent, or Firm* — Banner & Witcoff, Ltd.

(57) ABSTRACT

On a back surface portion of a grommet, a clamp encircling water stop lip disposed around a first clamp insertion hole and a weather strip lower part water stop lip disposed in a position below a weather strip placement portion are provided. A first protector clamp protrudes from the first clamp insertion hole so that the first protector clamp can be locked in a first body locking hole in a grommet concave portion.

3 Claims, 11 Drawing Sheets

(56) References Cited

U.S. PATENT DOCUMENTS

| | | | |
|---|---|---|---|
| 6,278,060 B1* | 8/2001 | Mori | 174/650 |
| 6,431,642 B2* | 8/2002 | Sora et al. | 296/208 |
| 6,479,748 B2* | 11/2002 | Mori | 174/651 |
| 6,660,937 B1* | 12/2003 | MacLeod et al. | 174/659 |
| 6,680,437 B2* | 1/2004 | Sato | 174/653 |
| 6,685,195 B2* | 2/2004 | Uchida et al. | 277/628 |
| 7,244,894 B1 | 7/2007 | Lipp | |
| 7,420,125 B2* | 9/2008 | Tsukamoto et al. | 174/153 G |
| 7,423,224 B2* | 9/2008 | Puhl | 174/650 |
| 7,434,814 B2* | 10/2008 | Kumakura et al. | 277/606 |
| 7,615,713 B2* | 11/2009 | Bardella et al. | 174/650 |
| 2002/0046863 A1* | 4/2002 | Heranney | 174/65 G |
| 2005/0194175 A1* | 9/2005 | Serizawa et al. | 174/65 G |
| 2006/0243484 A1* | 11/2006 | Serizawa et al. | 174/659 |
| 2013/0068502 A1* | 3/2013 | Law et al. | 174/152 G |

FOREIGN PATENT DOCUMENTS

| | | | |
|---|---|---|---|
| JP | 2003111247 A | * | 4/2003 |
| JP | 2005-086963 A | | 3/2005 |
| JP | 2005-349984 A | | 12/2005 |
| JP | 2012029408 A | * | 2/2012 |

OTHER PUBLICATIONS

Jun. 24, 2014—(WO) International Preliminary Report on Patentablity—App PCT/JP2012/082965—Eng Tran.

* cited by examiner

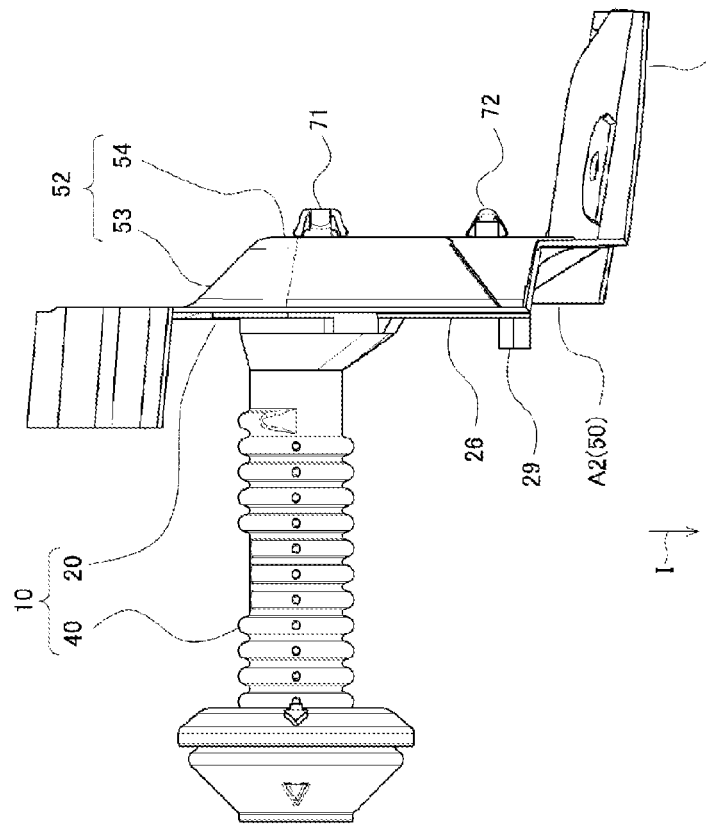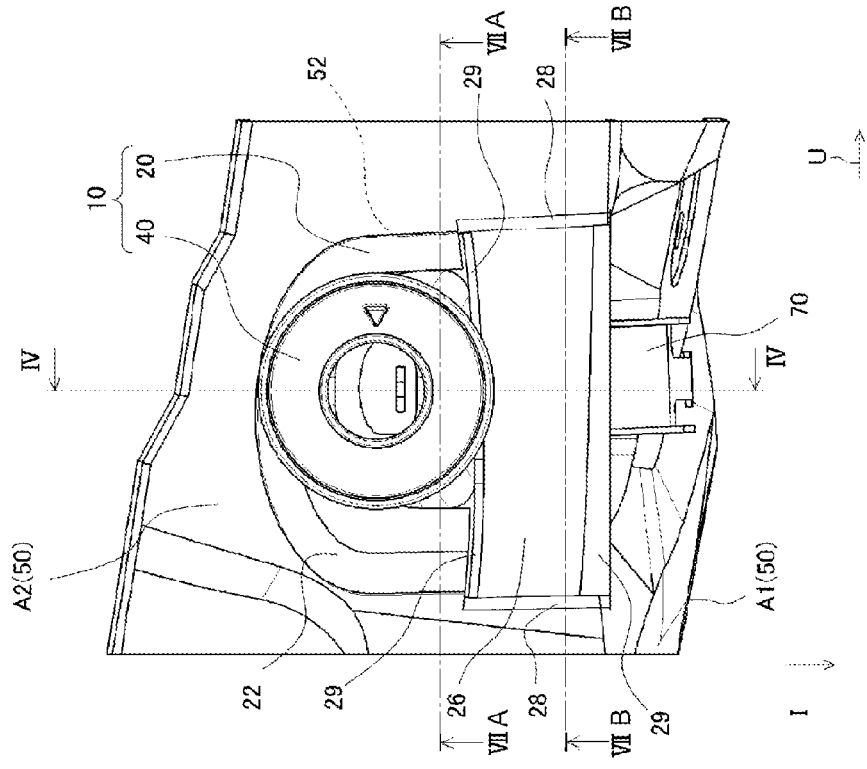

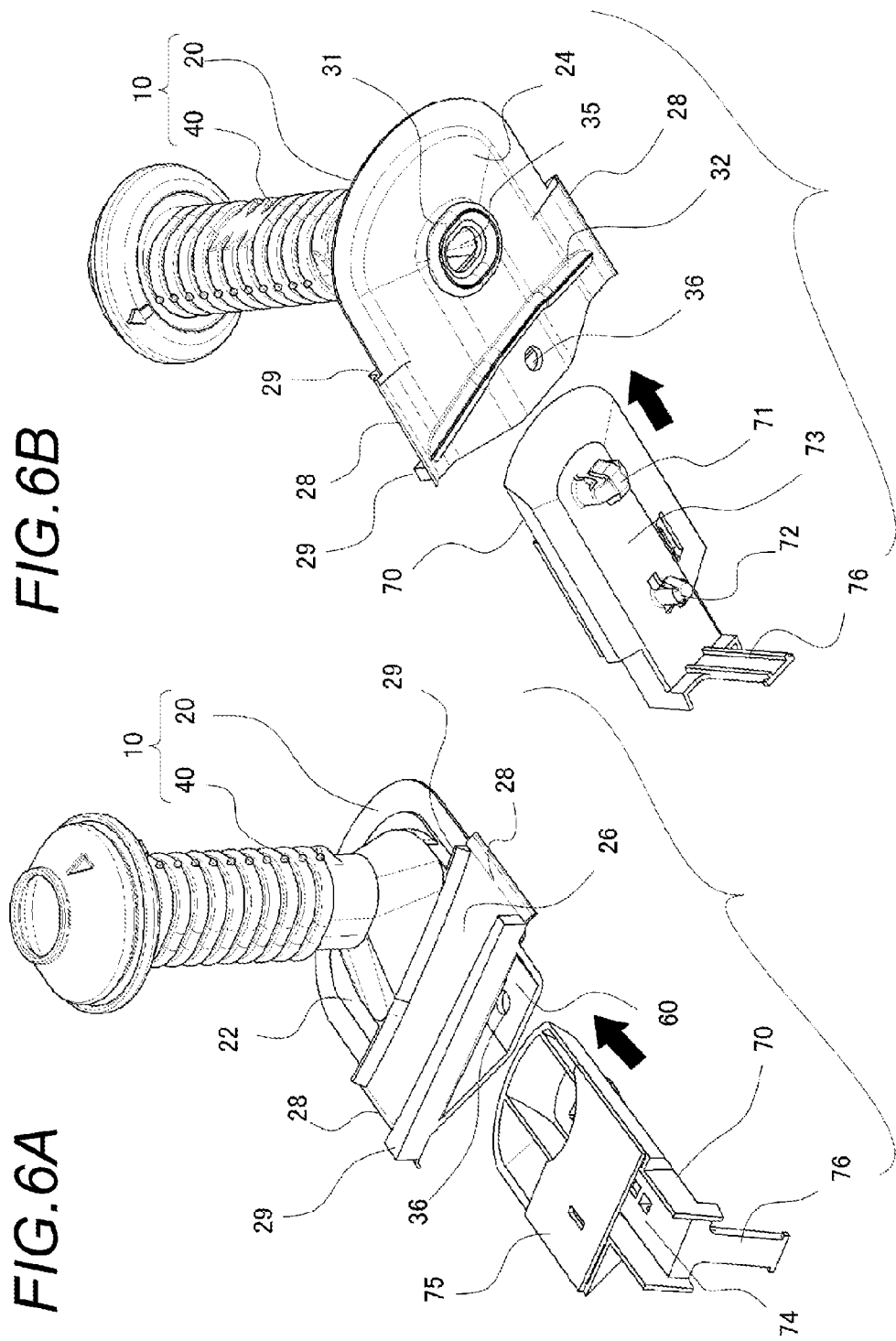

GROMMET AND WATER STOP STRUCTURE FOR VEHICLE DOOR

CROSS REFERENCE TO RELATED APPLICATION

This application is a continuation of PCT application No. PCT/JP2012/082965, which was filed on Dec. 19, 2012 based on Japanese Patent Application (No. 2011-281175) filed on Dec. 22, 2011, the contents of which are incorporated herein by reference. Also, all the references cited herein are incorporated as a whole.

BACKGROUND

1. Technical Field

The present invention relates to a grommet and a water stop structure for a vehicle door using the grommet.

2. Background Art

Conventionally, as a water stop (waterproofing) structure for a door harness cabled on a vehicle door, a waterproofing structure has been known in which a through hole and a concave portion for a grommet are provided on an end surface (side plate) of a door frame hinge-connected to the vehicle body, the grommet attached to the door harness is fitted in the through hole and the door harness is cabled from the door to the vehicle body. In addition, various technologies have been proposed for the improvement of the waterproofing structure and the improvement of workability.

For example, a technology is available where in a grommet to which a protector is attachable, by making changeable the diameter of the through hole through which the wire harness is passed at the protector, a multiplicity of wire harness diameters are handled by combining parts of one kind (see JP-A-2005-349984).

In a grommet of non-through type being attached to the vehicle body by a resin clamp, a structure called a water stop lip is formed along the outer periphery of the grommet. Such a structure is illustrated in FIG. 11A to FIG. 11C. FIG. 11A is a plan view, FIG. 11B is a XIB-XIB cross-sectional view of FIG. 11A, and FIG. 11C is a plan view schematically showing the disposition of a water stop lip 132 and a weather strip 90 of FIG. 11A.

As illustrated, a grommet 110 is provided with a grommet base portion 120 and a bellows portion 140. The grommet 110 has a protector 170 secured to its back surface portion (inner surface portion) 124, and is attached to a grommet concave portion 152 of a door panel 150 (a side plate part A2). On the back surface portion 124 of the grommet base portion 120, the water stop lip 132 is formed along the outer periphery. When the grommet 110 is attached to the grommet concave portion 152, the water stop lip 132 is pressed against a slanting wall portion 153 of the grommet concave portion 152 so as to be deformed, thereby preventing the water intrusion from the outside to the inside of the grommet 110.

In the grommet 110 of the structure shown in FIG. 11, since the water stop lip 132 is formed along the outer periphery of the grommet base portion 120, the peripheral length of the grommet 110 and the length of the water stop lip 132 are substantially similar. That is, a relatively long water stop lip 132 is required. Consequently, the insertion load in attaching the grommet 110 to the grommet concave portion 152 is heavy, so that a countermeasure technology is required from the viewpoint of workability. Moreover, since the water stop lip 132 abuts on the slanting wall portion 153, there are cases where the grommet 110 is attached in a state of being shifted in a horizontal direction with respect to the attachment surface due to the tolerance of a hole provided in the grommet concave portion 152 to lock a clamp portion 171, that is, the tolerance of the body panel, or the like. In this case, there is a worry that there are variations in the wrap amount of the water stop lip 132 and water stopping performance cannot be maintained, so that a different technology is required. The technology disclosed in JP-A-2005-349984 which adopts a similar structure has a similar problem.

SUMMARY OF THE INVENTION

An object of the present invention, which is made in view of such circumstances, is to provide a technology that solves the above-mentioned problem.

The above-mentioned object of the present invention is attained by a grommet and a water stop structure for a vehicle door having a structure described below.

(1) A grommet of non-through type being attached to a grommet accommodating concave portion formed on a door panel of a vehicle, the grommet having: a protector that accommodates a wire harness; and a grommet base portion that has a protector accommodating portion which accommodates the protector, wherein the grommet base portion includes: a clamp insertion opening provided on a back side of the grommet base portion; a first water stop lip protrudently formed around the clamp insertion opening; and a second water stop lip provided in a position closer to an inside of a vehicle cabin than the first water stop lip when attached to the grommet accommodating concave portion, the second water stop lip being formed so as to extend substantially in a vertical direction of the vehicle, the protector has a clamp which is engaged with the door panel on a bottom surface, and the clamp protrudes from the clamp insertion opening so that the clamp can be locked on the door panel when the protector is accommodated in the protector accommodating portion.

(2) The grommet of the above-described structure (1), wherein the grommet base portion has a weather strip placement portion where a weather strip is placed so as to stride on an outer surface side and the second water stop lip is formed in a position corresponding to an area of the weather strip placement portion.

(3) A water stop structure for a vehicle door having a weather strip, wherein the grommet of the above-described structure (1) or (2) is attached to the grommet accommodating concave portion formed on the door panel of the vehicle and the weather strip is placed so as to stride over the grommet, and wherein the first water stop lip is pressed against a plane part vertical to an attachment direction, the plane part being formed on the grommet accommodating concave portion.

BRIEF DESCRIPTION OF THE DRAWINGS

FIG. 3A and FIG. 3B are a plan view and a side view showing a grommet attachment structure according to the present embodiment.

FIG. 6A and FIG. 6B are perspective views from the front and the back of the grommet and a protector according to the present embodiment.

DETAILED DESCRIPTION OF THE EXEMPLARY EMBODIMENTS

Hereinafter, a mode for carrying out the invention (hereinafter, referred to as "embodiment") will be described with reference to the drawings.

Figure 1:
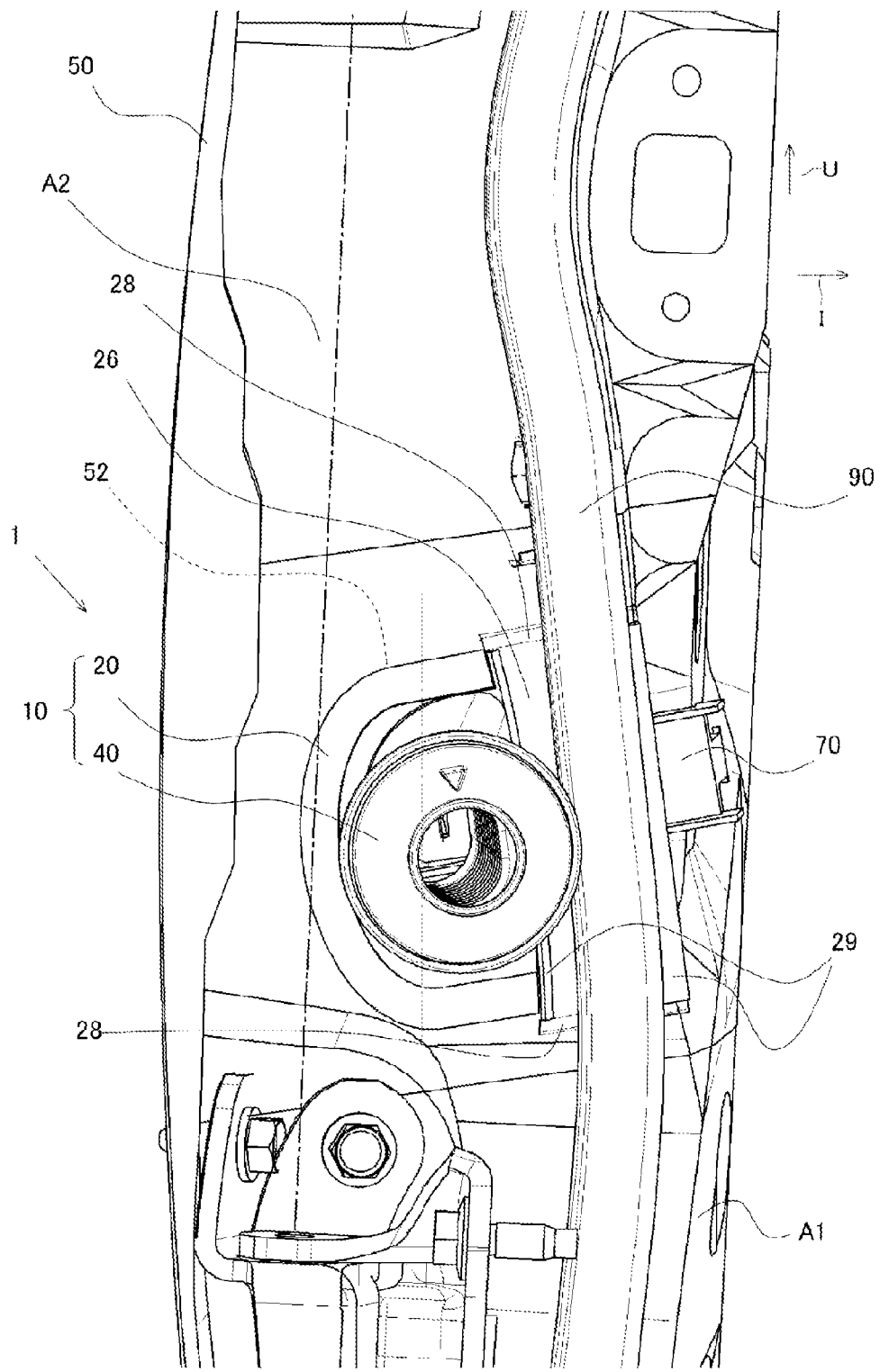
FIG. 1 is a view showing a door panel under a condition where a grommet and a weather strip are attached according to an embodiment of the present invention.

FIG. 1 is a plan view showing a structure 1 for grommet attachment to a door panel 50 according to an embodiment of the present invention. As illustrated, in the grommet attachment structure 1 of the present embodiment, a grommet 10 is attached to a grommet concave portion (grommet accommodating concave portion) 52 formed on a side plate part A2 of the door panel 50. Further, a weather strip 90 is secured to the door panel 50 (the side plate part A2) so as to stride over the grommet 10. At this time, in the grommet concave portion 52, the entire surface of the part on the vehicle outer side of the weather strip 90 is covered with the grommet 10.

Figure 2A:
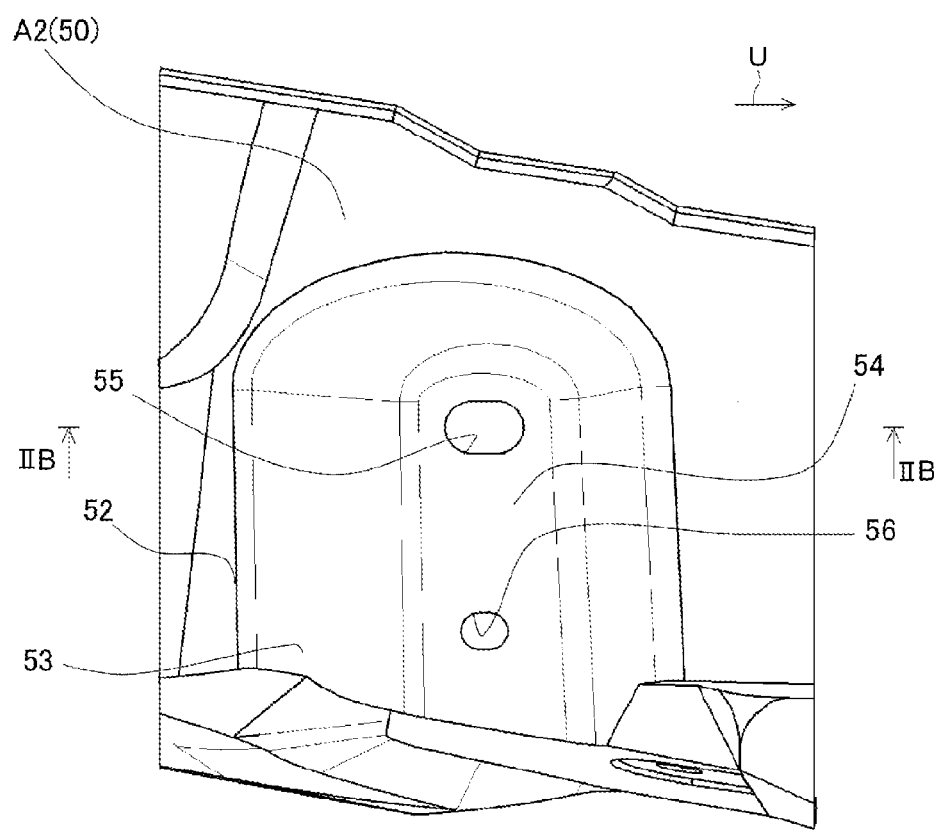
FIG. 2A is a plan view of a grommet concave portion where the grommet is attached according to the present embodiment.
Figure 2B:
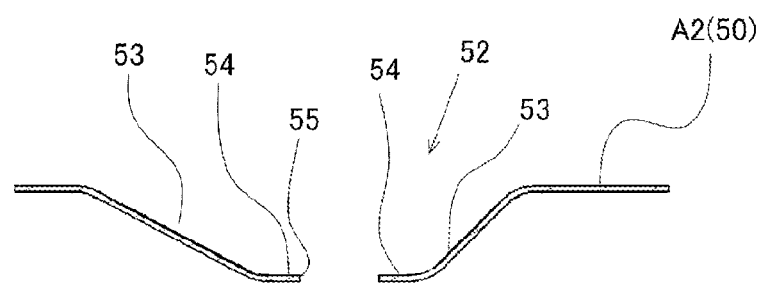
FIG. 2B is a IIB-IIB cross-sectional view of FIG. 2A.

As shown in the plan view of the grommet concave portion 52 of FIG. 2A and in the cross-sectional view of FIG. 2B (IIB-IIB cross-sectional view of FIG. 2A), the grommet concave portion 52 is formed on the side plate part A2 of the door panel 50, and the grommet 10 which is of a non-through type is inserted and secured in the grommet concave portion 52.

The grommet concave portion 52 is, as shown in FIG. 2B, inverted trapezoidal in cross section, and formed of a slanting wall portion 53 and a plane bottom portion 54. Further, as shown in FIG. 2A, a first body locking hole 55 and a second body locking hole 56 are formed in the plane bottom portion 54, and a later-described first protector clamp 71 and second protector clamp 72 of the grommet 10 (a protector 70) are locked therein.

Figure 4:
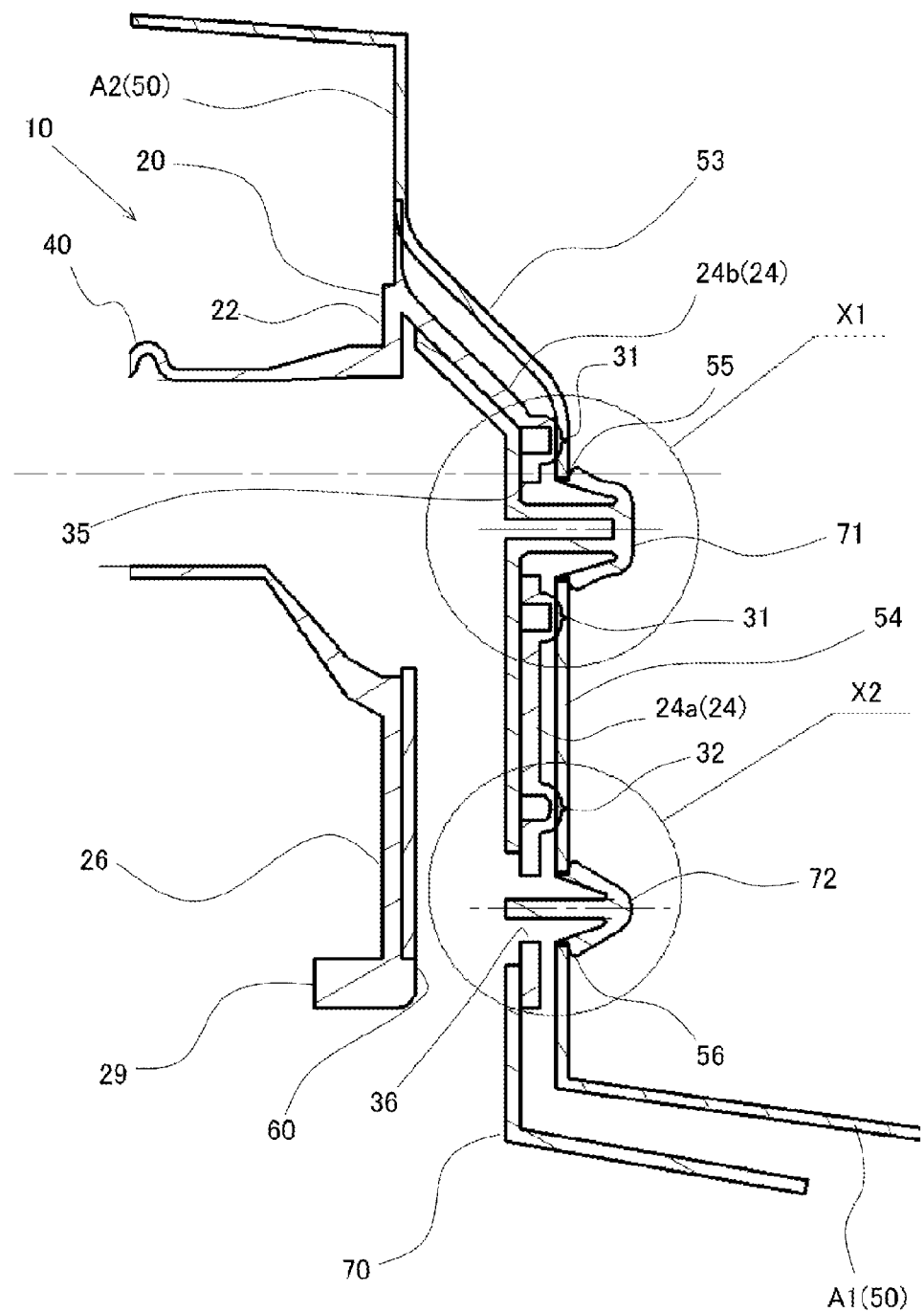
FIG. 4 is a IV-IV cross-sectional view of FIG. 3A.
Figure 5A:
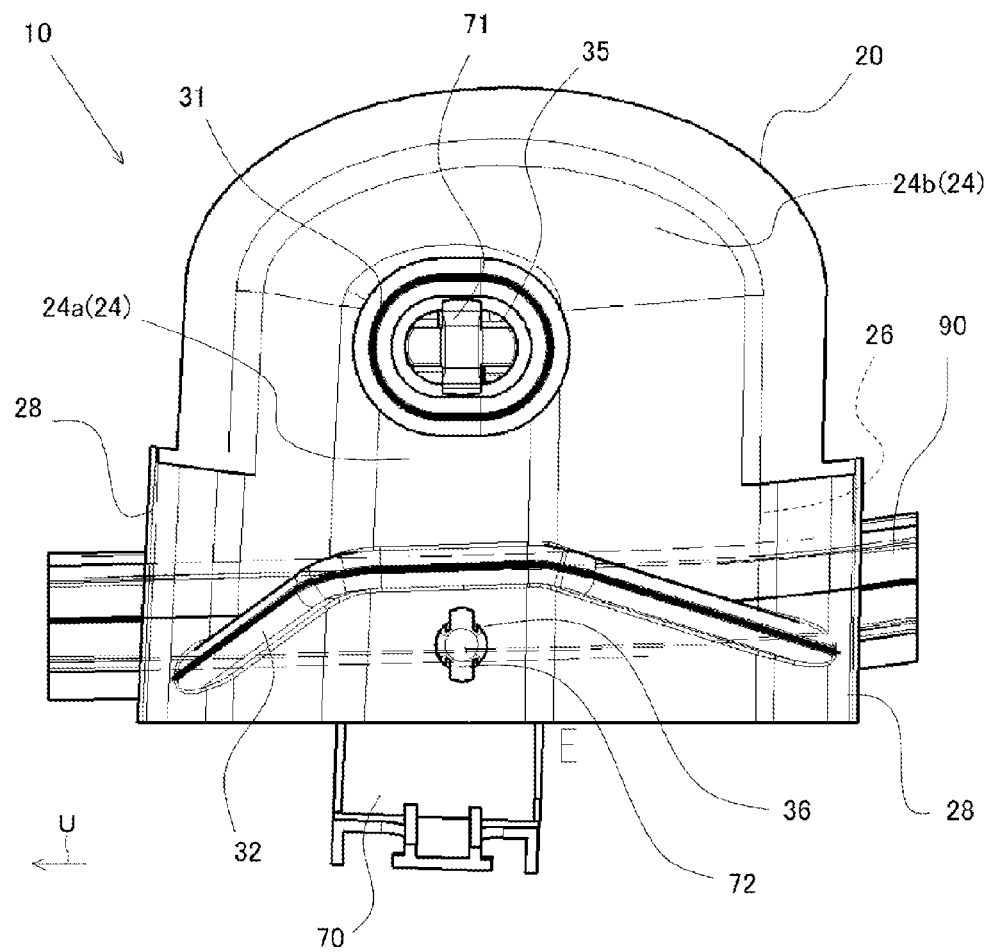
FIG. 5A is a view showing the structure of a back side (inner surface portion) of the grommet according to the present embodiment.
Figure 5B:
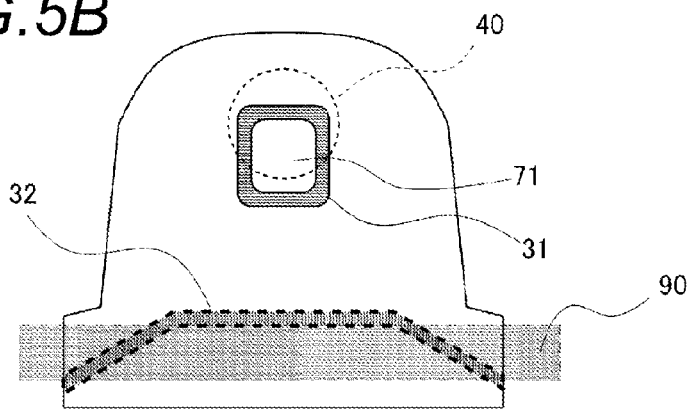
FIG. 5B is a view schematically showing FIG. 5A.
Figure 7A:
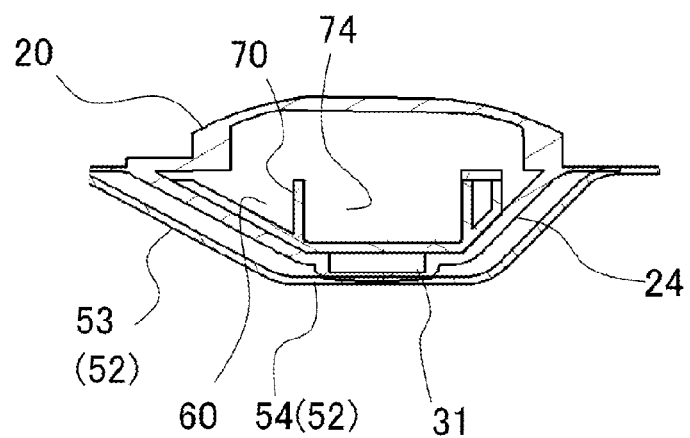
FIG. 7A and FIG. 7B are cross-sectional views (a VIIA-VIIA cross-sectional view and a VIIB-VIIB cross-sectional view of FIG. 3A) of the grommet attachment structure according to the present embodiment.
Figure 7B:
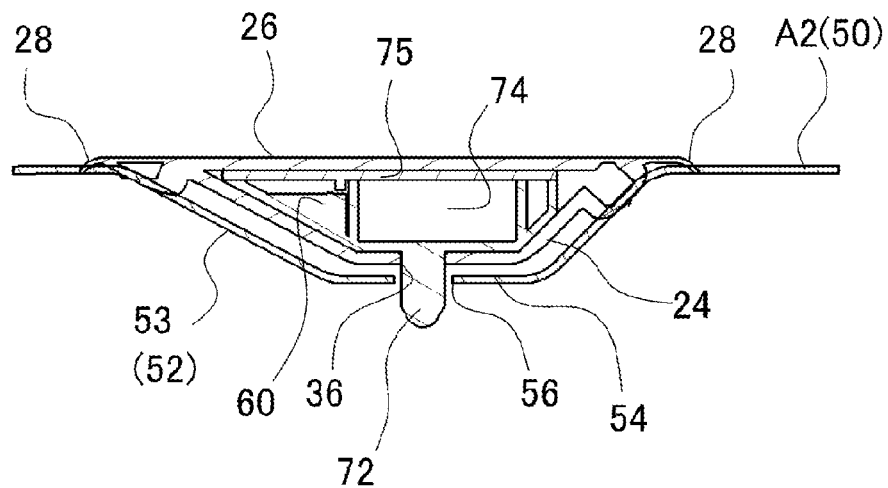
Figure 8A:
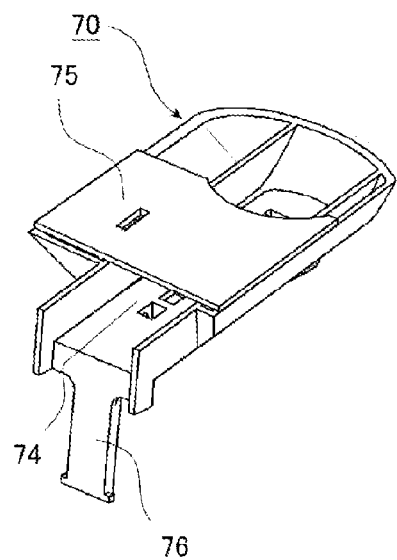
FIG. 8A is a perspective view, viewed from above, of a condition where a lid portion of the protector is closed according to the present embodiment.
Figure 8B:
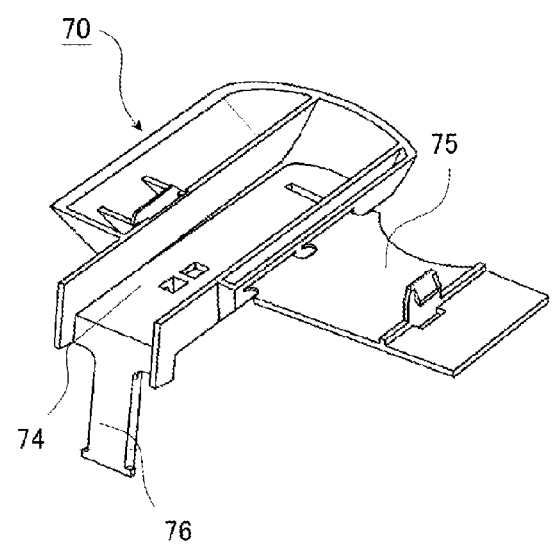
FIG. 8B is a perspective view, viewed from above, of a condition where the lid portion is opened.
Figure 8C:
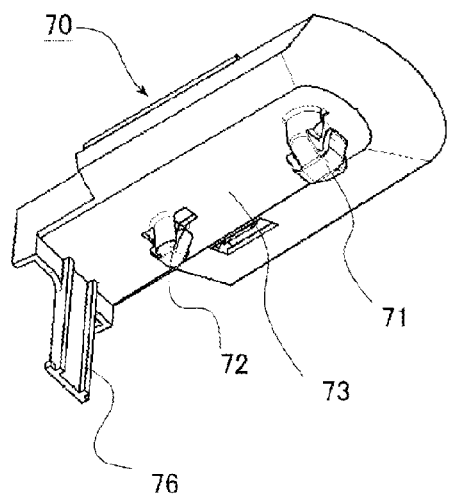
FIG. 8C is a perspective view viewed from below.
Figure 9:
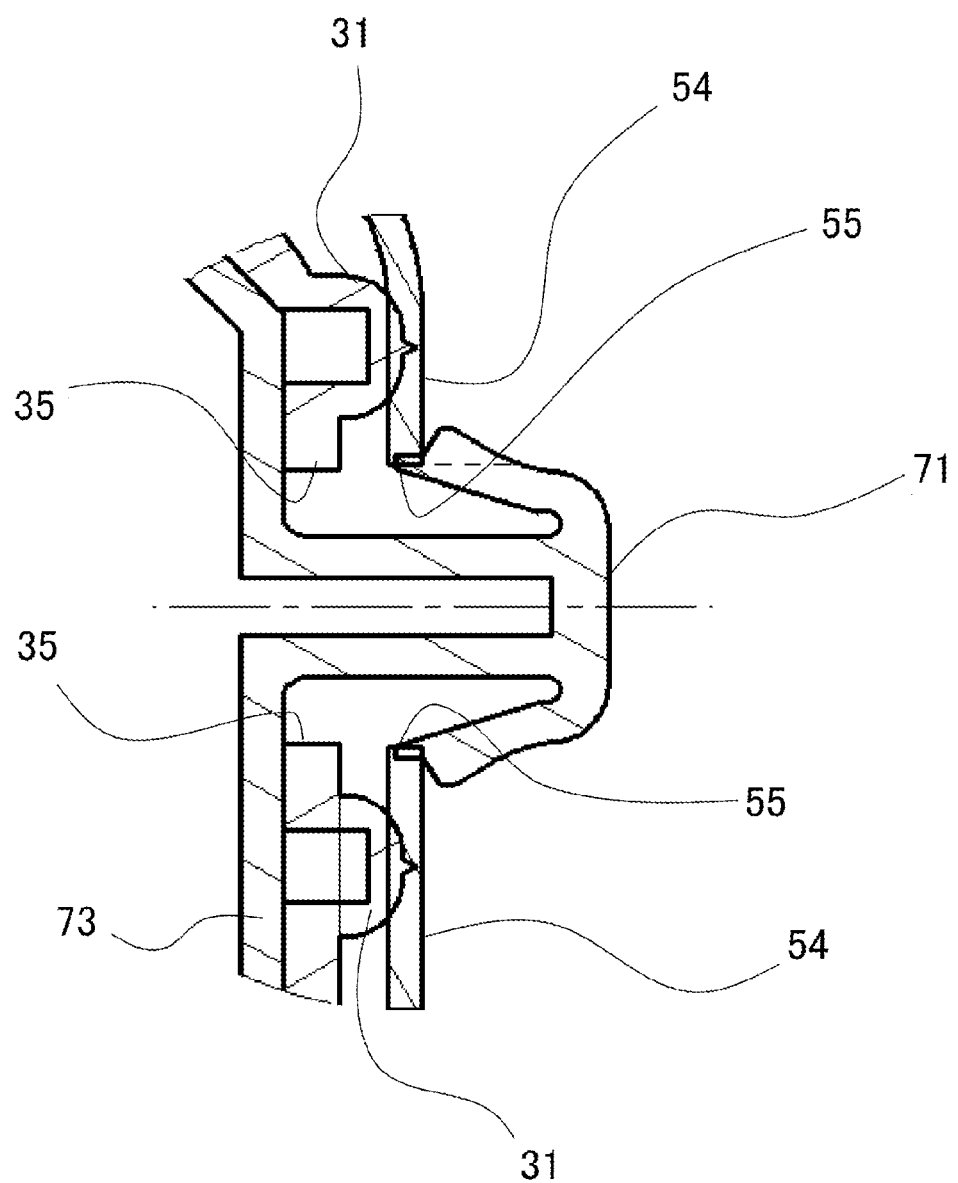
FIG. 9 is an enlarged view of an area X1 of FIG. 4 according to the present embodiment.
Figure 10:
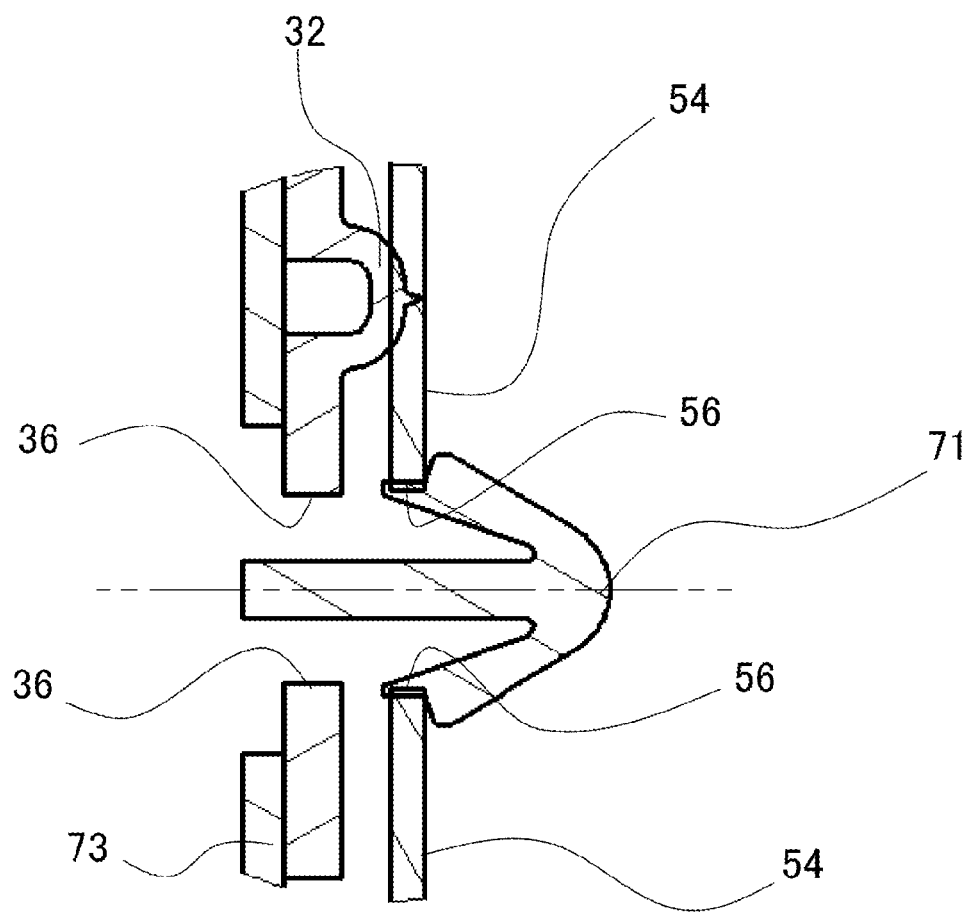
FIG. 10 is an enlarged view of an area X2 of FIG. 4 according to the present embodiment.
Figure 11A:
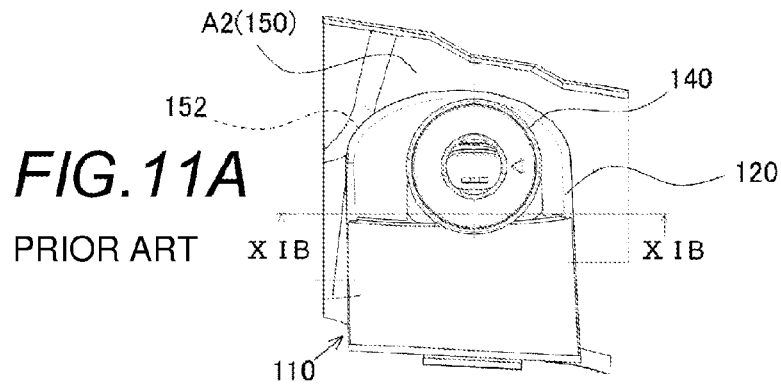
FIG. 11A is a plan view showing the grommet attachment structure according to the prior art.
Figure 11B:
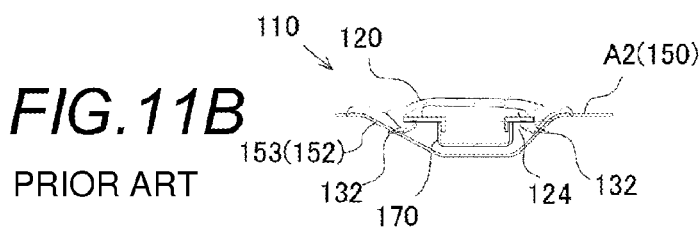
FIG. 11B is an XIB-XIB cross-sectional view of FIG. 11A.
Figure 11C:
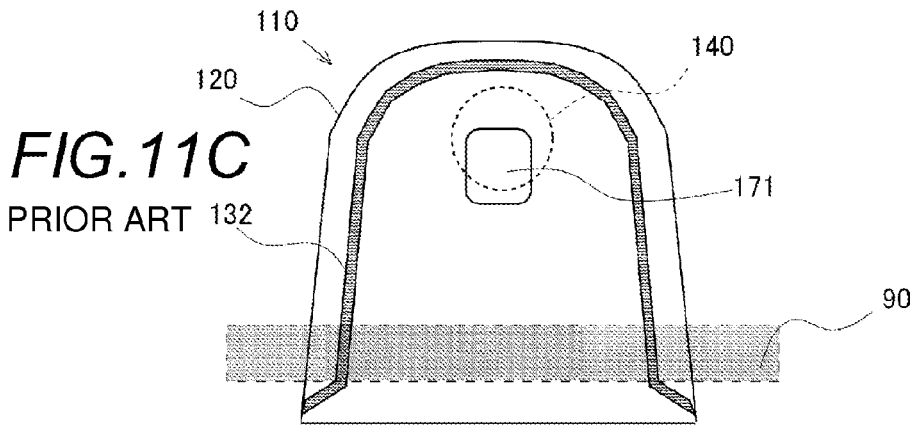
FIG. 11C is a view schematically showing FIG. 11A.

FIG. 3A shows a plan view of an area where the grommet 10 is attached to the grommet concave portion 52, and FIG. 3B shows a side view. Further, FIG. 4 shows a IV-IV cross-sectional view of FIG. 3A (mainly the structure on the door panel 50 side of a grommet base portion 20). FIG. 5A shows a view of the grommet 10 viewed from the back side under a condition where the weather strip 90 is placed. FIG. 5B is a view schematically showing FIG. 5A so as to be comparable with FIG. 11B shown in Prior Art. FIG. 6A and FIG. 6B show perspective views of the grommet 10 under a condition where the protector 70 is detached, FIG. 6A is a perspective view from the front, and FIG. 6B is a perspective view from the back. FIG. 7A and FIG. 7B are cross-sectional views at positions in the vertical direction of FIG. 3A, FIG. 7A is a VIIA-VIIA cross-sectional view, and FIG. 7B is a VIIB-VIIB cross-sectional view. FIG. 8 is perspective views of the protector 70 provided in the grommet 10, FIG. 8A is a perspective view, viewed from above, of a condition where a lid portion 75 is closed, FIG. 8B is a perspective view, viewed from above, of a condition where the lid portion 75 is opened, and FIG. 8C is a perspective view viewed from below. Further, FIG. 9 is a view where an area X1 of FIG. 4 is enlarged to show the locking state of the first protector clamp 71 in detail. FIG. 10 is a view where an area X2 of FIG. 4 is enlarged to show the locking state of the second protector clamp 72 in detail.

In the figures, the arrow U indicates the upside of the vehicle, and the arrow I indicates the inside of the vehicle cabin.

The grommet 10 is made of an elastic material such as EPDM (ethylene-propylene rubber), has the function of directing a non-illustrated wire harness from the door panel surface to the vehicle body side, and is provided with the grommet base portion 20 and a bellows portion 40. Further, in the grommet 10, the protector 70 is provided, for example, as shown in FIG. 6A and FIG. 6B. This grommet 10 is of a non-through type attached to the grommet concave portion 52 formed over an inner plate part A1 and the side plate part A2.

The bellows portion 40 is a bellows cylindrical member attached to an outer surface portion 22 of the grommet base portion 20, and communicates with the inside of the grommet base portion 20, that is, a harness accommodating portion 74. Therefore, the wire harness accommodated in the harness accommodating portion 74 is directed from the door panel surface to the vehicle body side through the bellows portion 40.

On the grommet base portion 20, a protector accommodating portion 60 for accommodating the protector 70 is formed. The shape of the protector accommodating portion 60 is adapted to the shape of the protector 70, and a locking structure for appropriately securing the protector 70 when it is accommodated is provided.

The external shape of the grommet base portion 20 is substantially rectangular (inverted trapezoidal), and the upper and lower corners on the left side illustrated in FIG. 1 are rounded. The side surface part on the right side illustrated in FIG. 1 is formed so that it is fitted right on the inner plate part A1 of the vehicle panel so as to be substantially flush therewith.

On the outer surface portion 22 of the grommet base portion 20, a weather strip placement portion 26 is formed so as to adjoin the vehicle interior side of the bellows portion 40 on a plane extending in the vertical direction. On the upper and lower end portions of the weather strip placement portion 26, lip portions 28 are formed, and are placed on a part outside the periphery of the grommet concave portion 52, that is, on a plane part of the side plate part A2. The lip portions 28 are substantially triangular in cross section, are tapered toward the end portion, and eliminate the level difference at the boundary between the weather strip placement portion 26 and the door panel 50 (the side plate part A2). On the right and left of the weather strip placement portion 26, a weather strip restricting wall 29 is formed. This weather strip restricting wall 29 restricts the weather strip 90 to a desired placement position.

On a back surface portion 24 (the grommet concave portion 52 side) of the grommet base portion 20, a first clamp insertion hole (clamp insertion opening) 35 and a second clamp insertion hole 36 communicating with the protector accommodating portion 60 are formed. Through the first clamp insertion hole 35 and the second clamp insertion hole 36, the first protector clamp 71 and the second protector clamp 72 formed on a protector bottom surface 73 of the protector 70 are passed, respectively. Specifically, as shown in FIG. 4 and FIG. 6B, the first clamp insertion hole 35 is formed in a plane part 24*a* substantially immediately below the bellows portion 40. Further, the second protector clamp 72 is formed in a position that is offset from the first clamp insertion hole 35 toward the inside of the vehicle cabin, more specifically, a position below the weather strip placement portion 26. The first protector clamp 71 and the second protector clamp 72 are structured so as to coincide right with the first body locking hole 55 and the second body locking hole 56, respectively, when the grommet 10 is placed in the grommet concave portion 52.

Around the first clamp insertion hole 35, a clamp encircling water stop lip (first water stop lip) 31 is protrudently formed so as to encircle the first clamp insertion hole 35. In the center of the top portion of the protrusion of the clamp encircling water stop lip 31 in the direction of the width, a thin fin shape is formed in a predetermined height. When the grommet 10 is attached to the grommet concave portion 52, the clamp encircling water stop lip 31 is pressed against the plane bottom portion 54 of the grommet concave portion 52 and delivers desired water stopping performance. That is, water intrusion from the first clamp insertion hole 35 is prevented.

Further, on the back surface portion 24 of the grommet base portion 20, a weather strip lower part water stop lip (second water stop lip) 32 is protrudently formed so as to extend in the vertical direction of the vehicle in a corresponding position on the opposite side of the weather strip placement portion 26 (a position on the inside of the vehicle cabin of the clamp encircling water stop lip 31 when attached to the grommet concave portion 52). In the center of the top portion of protrusion of the weather strip lower part water stop lip 32 in the direction of the width, a thin fin shape is formed in a predetermined height. Specifically, the weather strip lower part water stop lip 32 is formed substantially straightly in the vertical direction at the plane part 24*a* of the back surface portion 24 and obliquely so as to approach the inside of the vehicle cabin toward the end portion at a slanting wall part 24*b*. The second clamp insertion hole 36 is situated on the inside of the vehicle cabin of the weather strip lower part water stop lip 32. Water intrusion to the inside of the vehicle cabin is prevented by the weather strip lower part water stop lip 32.

The protector 70 accommodated in the protector accommodating portion 60 of the grommet base portion 20 has, for example as shown in FIG. 6A, FIG. 6B and FIG. 8A to FIG. 8C, the harness accommodating portion 74, the lid portion 75 and a harness bundling portion 76. The harness accommodating portion 74 is, for example as shown in FIG. 7A and FIG. 7B, inverted trapezoidal in cross section and hollow. The wire harness is accommodated in the harness accommodating portion 74, and after it is accommodated, the lid portion 75 is closed. The lid portion 75 is not formed at the part communicating with the bellows portion 40. The harness accommodating portion 74 and the lid portion 75 are accommodated in the protector accommodating portion 60 of the grommet base portion 20. At the harness bundling portion 76, wire harnesses are bundled.

Further, on the protector bottom surface 73 on the back side of the harness accommodating portion 74, the first protector clamp 71 and the second protector clamp 72 are formed. As described above, the first protector clamp 71 outwardly protrudes from the first clamp insertion hole 35 of the grommet base portion 20 when the protector 70 is accommodated in the protector accommodating portion 60. Likewise, the second protector clamp 72 protrudes from the second clamp insertion hole 36 of the grommet base portion 20.

Moreover, as shown in FIG. 4, FIG. 7A, FIG. 7B and FIG. 9, when the grommet 10 to which the protector 70 is attached is attached to the grommet concave portion 52, the first protector clamp 71 is locked in the first body locking hole 55 provided on the plane bottom portion 54, and the second protector clamp 72 is locked in the second body locking hole 56.

At this time, the clamp encircling water stop lip 31 is elastically deformed by being pressed vertically (in the attachment direction) against the plane bottom portion 54 (plane part) vertical to the direction of attachment of the grommet 10. Consequently, water intrusion from the periphery of the clamp encircling water stop lip 31 into the first clamp insertion hole 35 is prevented. Moreover, the weather strip lower part water stop lip 32 is elastically deformed by being pressed against the slanting wall portion 53 and the plane bottom portion 54 of the grommet concave portion 52 in a position below the weather strip 90 (the weather strip placement portion 26) (a position corresponding to the area of the weather strip placement portion 26). Consequently, water intrusion from the weather strip lower part water stop lip 32 to the inside of the vehicle cabin is prevented.

The clamp encircling water stop lip 31 is formed so as to be flush with the plane part 24*a*, and vertically pressed against the plane bottom portion 54 of the door panel 50. Consequently, even if the grommet concave portion 52 of the door panel 50 has a dimension error due to tolerance or the like, desired water stopping performance can be maintained. Moreover, the weather strip lower part water stop lip 32 is also vertically pressed at the plane part 24*a*. Moreover, at the slanting wall part 24*b*, the weather strip lower part water stop lip 32 extends substantially along the slanting surface of the slanting wall portion 53, and is not formed so that the outer periphery is covered with the slanting wall portion 53. Consequently, the weather strip lower part water stop lip 32 absorbs the dimension error due to tolerance or the like in the grommet concave portion 52, so that desired water stopping performance can be maintained.

Moreover, as is apparent from comparison between FIG. 5B and FIG. 11B, the total length of the clamp encircling water stop lip 31 and the weather strip lower part water stop lip 32 can be made shorter than the length of the conventional water stop lip 132. Consequently, the attachment load in attaching the grommet 10 to the grommet concave portion 52 can be reduced, so that workability can be improved.

Now, brief summaries of characteristics of the above-described embodiment of the grommet and the water stop structure for a vehicle door according to the present invention will be listed in the following paragraphs i to iii:

[i] The grommet 10 of non-through type being attached to the grommet accommodating concave portion (the grommet concave portion 52) formed on the door panel 50 of the vehicle, the grommet having: the protector 70 that accommodates a wire harness; and the grommet base portion 20 that has the protector accommodating portion 60 which accommodates the protector 70, wherein the grommet base portion 20 includes: the clamp insertion opening (the first clamp insertion hole 35) provided on the back side of the grommet base portion; the first water stop lip (the clamp encircling water stop lip 31) protrudently formed around the clamp insertion opening (the first clamp insertion hole 35); and the second water stop lip (the weather strip lower part water stop lip 32) provided in a position closer to an inside of the vehicle cabin than the first water stop lip (the clamp encircling water stop lip 31) when attached to the grommet accommodating concave portion (the grommet concave portion 52), the second water stop lip being formed so as to extend substantially in the vertical direction of the vehicle, the protector 70 has the clamp (the first protector clamp 71) which is engaged with the door panel 50 on the bottom surface, and the clamp (the first protector clamp 71) protrudes from the clamp insertion opening (the first clamp insertion hole 35) so that the clamp can be locked on the door panel 50 when the protector 70 is accommodated in the protector accommodating portion 60.

[ii] The grommet 10 of the above-described structure [i], wherein the grommet base portion 20 has the weather strip placement portion 26 where the weather strip 90 is placed on the outer surface side and the second water stop lip (the weather strip lower part water stop lip 32) is formed in a position corresponding to the area of the weather strip placement portion 26.

[iii] A water stop structure for a vehicle door having a weather strip, wherein the grommet 10 of the above-described structure [i] or [ii] is attached to the grommet accommodating concave portion (the grommet concave portion 52) formed on the door panel 50 of the vehicle and the weather strip 90 is placed so as to stride over the grommet 10, wherein the first water stop lip (the clamp encircling water stop lip 31) is pressed against the plane part (the plane bottom part 54) vertical to the attachment direction, the plane part being formed on the grommet accommodating concave portion (the grommet concave portion 52).

The present invention has been described based on an embodiment. It is to be understood by one of ordinary skill in the art that this embodiment is illustrative, various modifications are possible in components and combinations thereof and such modifications are embraced by the present invention.

According to the grommet and the water stop structure for a vehicle door based on the present invention, the length of the lip structure for stopping water can be reduced, so that the insertion load in attaching the grommet can be reduced. Moreover, from a different point of view, as the lip structure for stopping water, a plane abutment lip structure may be adopted, so that desired water stopping performance can be delivered even if there are variations in the dimensions of the body panels.

What is claimed is:

1. A grommet of non-through type being attached to a grommet accommodating concave portion formed on a door panel of a vehicle, the grommet comprising:
    a protector that accommodates a wire harness; and
    a grommet base portion that has a protector accommodating portion which accommodates the protector,
    wherein the grommet base portion includes:
        a clamp insertion opening provided on a back side of the grommet base portion;
        a first water stop lip protrudently formed around the clamp insertion opening; and
        a second water stop lip provided in a position closer to an inside of a vehicle cabin than the first water stop lip when attached to the grommet accommodating concave portion, the second water stop lip being formed so as to extend substantially in a vertical direction of the vehicle; and
    wherein the protector has a clamp which is engaged with the door panel on a bottom surface, and the clamp protrudes from the clamp insertion opening so that the clamp can be locked on the door panel when the protector is accommodated in the protector accommodating portion.

2. The grommet according to claim 1, wherein the grommet base portion has a weather strip placement portion where a weather strip is placed so as to stride on an outer surface side; and
    wherein the second water stop lip is formed in a position corresponding to an area of the weather strip placement portion.

3. A water stop structure for a vehicle door having a weather strip, wherein the grommet according to claim 1 is attached to the grommet accommodating concave portion formed on the door panel of the vehicle and the weather strip is placed so as to stride over the grommet; and
    wherein the first water stop lip is pressed against a plane part vertical to an attachment direction, and the plane part being formed on the grommet accommodating concave portion.

* * * * *